United States Patent [19]

Heitmann et al.

[11] Patent Number: 5,043,825
[45] Date of Patent: Aug. 27, 1991

[54] INTERMEDIATE PICTURE FIELD STORAGE SYSTEM FOR SLOW MOTION PLAYBACK OF VIDEO TAPE RECORDING

[75] Inventors: Jürgen Heitmann, Alsbach/Hahnlein; Jürgen Müller, Griesheim, both of Fed. Rep. of Germany

[73] Assignee: BTS Broadcast Television Systems GmbH, Darmstadt, Fed. Rep. of Germany

[21] Appl. No.: 404,074

[22] Filed: Sep. 7, 1989

[30] Foreign Application Priority Data

Sep. 15, 1988 [DE] Fed. Rep. of Germany ....... 3831366

[51] Int. Cl.⁵ .............................................. H04N 9/87
[52] U.S. Cl. ..................................... 358/312; 358/327
[58] Field of Search ................. 358/312, 314, 327; 360/10.1, 10.3

[56] References Cited

U.S. PATENT DOCUMENTS

| | | | |
|---|---|---|---|
| 4,451,857 | 5/1984 | Mikado | 358/312 |
| 4,558,377 | 12/1985 | Collins et al. | 358/312 |
| 4,731,659 | 3/1988 | Kani | 358/312 |
| 4,905,099 | 2/1990 | Mester et alk. | 358/320 |
| 4,907,181 | 3/1990 | Hedtke et al. | 358/327 |

Primary Examiner—Robert L. Richardson
Assistant Examiner—Khoi Truong
Attorney, Agent, or Firm—Frishauf, Holtz, Goodman & Woodward

[57] ABSTRACT

For slow motion playback operation with a digital video magnetic tape recording and reproducing equipment an intermediate memory system has four picture field memories of which there are always three available for writing into but only one of them at a time is in read-out operation. In a first reading operation of a particular picture field memory an AND correlation of a write flag and an error flag is necessary for providing an error recognition signal to following circuits and before a reading goes to the next address the write flag is erased by writing in a logic zero, but the correlated signal is used to rewrite the error flag in the error flag memory. In subsequent readings any error flag is transmitted and rewritten, but all write flags remain erased to signify that the memory has been read out at least once.

3 Claims, 2 Drawing Sheets

INTERMEDIATE PICTURE FIELD STORAGE SYSTEM FOR SLOW MOTION PLAYBACK OF VIDEO TAPE RECORDING

CROSS REFERENCE TO RELATED PENDING APPLICATION

Application of Roland MESTER, Jurgen HEITMANN, Rolf LOOS and Jurgen MULLER, Ser. No. 07/201,484, filed June 1, 1988, and now Pat. No. 4,905,099.

This invention concerns an intermediate picture field storage system of the kind described in the above-cross-referenced copending U.S. patent application of which the present applicant was one of the joint applicants.

In that copending patent application a picture field intermediate storage system is described which was directed to resolving a variety of problems in the playback of digitally recorded video signals at various speeds. On the one hand the picture field memory of the system served for deshuffling the reproduced digital signals made necessary by a shuffling procedure in recording which is performed to scatter the effects of bunched errors over the picture, and, on the other hand these memories also served for correcting timing errors of video data played back from the magnetic tape on which they were recorded. In addition, the picture field memories of the system were needed for stop-frame reproduction, slow motion (time expansion) playback and fast motion (time compression) playback. In that multipurpose picture field memory system, however, the operation mode in slow motion playback was limited in slow motion range to speeds above about half the normal speed as a consequence of the use of write flag memories associated with the respective picture field memories.

The reason for that limitation is an excessively slow erasing procedure in the respective write flag memories. In that system the write flags in the respective write flag memories were to be erased in the last reading of the corresponding picture field memory. Since this erasing can take place only in the form of overwriting in the write flag memory addresses in a random access memory (RAM), the time interval required for running through addresses by the address generator essentially limited the slow motion speeds to those fairly close to the normal playback speeds.

SUMMARY OF THE INVENTION

It is an object of the present invention to provide a picture field memory system of the above-described kind in which there is an extended range of slow motion speeds at which playback can be provided for digitally recorded video signals.

Briefly, the signal of an error flag EF and of a write flag WF are logically correlated to provide a modified error flag output while video data are read out at the first reading out of a picture field memory in a mode of operation at a playback speed less than the speed at which the signals were recorded and then that output is written back as an error flag in the error flag memory while at the same time a corresponding erasure is produced in a memory provided for the write flags WF. These operations are all performed before the common addressing of video data and flag memories changes. This procedure is advantageously performed by providing static random access memories for the write and error flags and dynamic random access memories for the video data.

The memory system of the present invention has the advantage that playback with time expansion can now be performed in a simple way without great circuit expense even in operation with time expansion greater than 50%. The use of static memories for the write and error flags also reduces the cost of memory capacity in the system.

BRIEF DESCRIPTION OF THE DRAWING

The invention is further described by way of illustrative example with reference to the annexed drawing, in which.

DESCRIPTION OF THE ILLUSTRATED EMBODIMENT

Figure 1:
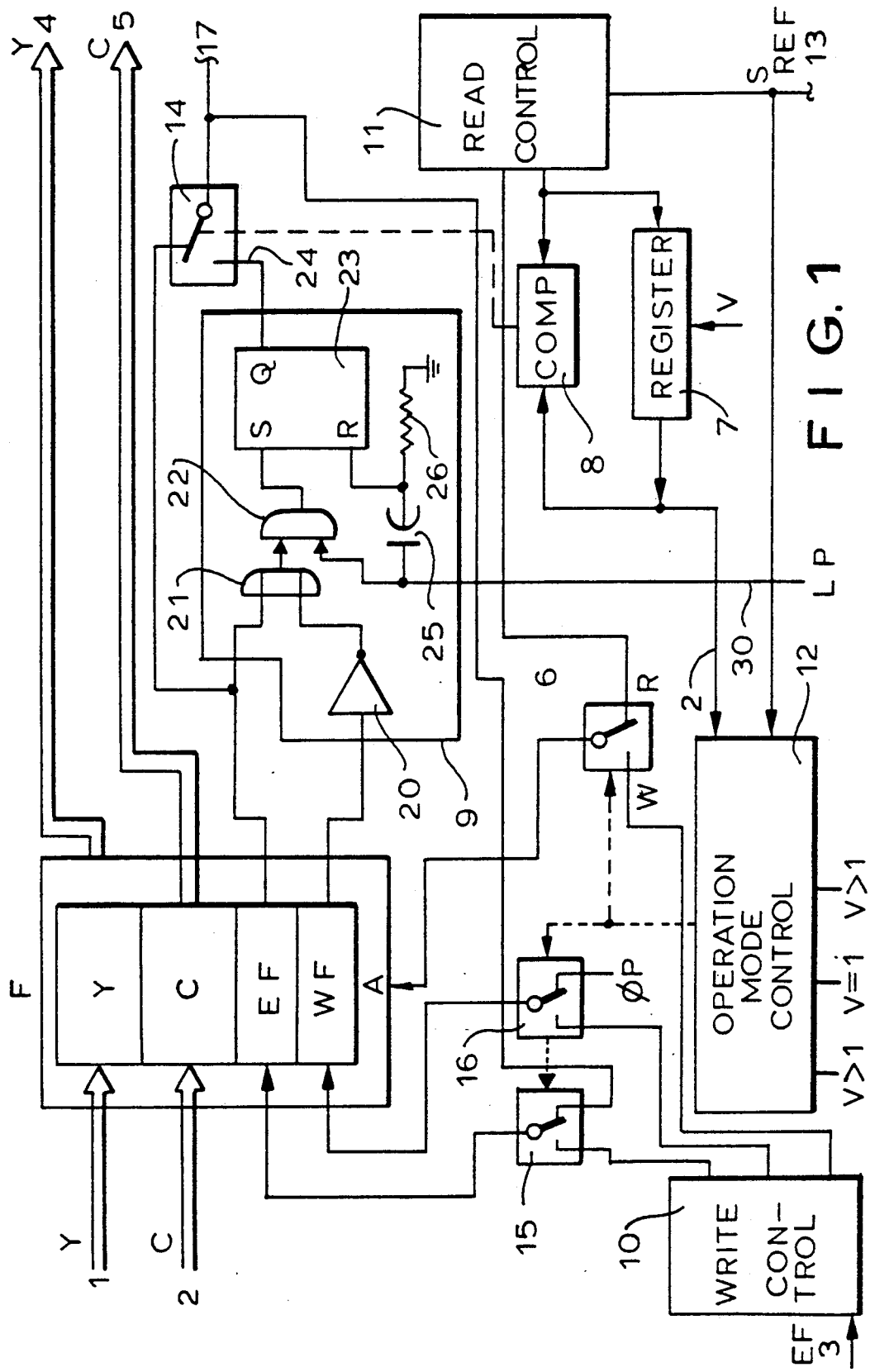
FIG. 1 is a somewhat simplified diagram of a system embodying the invention.

For simplification of the schematic representation in the drawing, only one picture field memory of the four picture field memories of the system is shown in FIG. 1. The memory arrangement shown can be very simply extended to include the other picture field memories by parallel connection of data and control buses and lines. As described in the above-mentioned copending application, the contents of which are here incorporated by reference, the picture field memories which are connected together are so controlled that one picture field memory is used for read out while the three other picture field memories are available for write-in. The switching over of the four picture field memories takes place during the vertical blanking intervals in a manner dependent upon a reference synchronization signal $S_{REF}$ supplied at the terminal 13.

In a manner corresponding to the disclosure of the referenced copending application, luminance information Y and chrominance information C are supplied in bit-parallel form respectively at inputs 1 and 2 of a picture field memory F. In parallel to the video data Y, C an error flag may be supplied relating to erroneous video data at an input 3 of a write control circuit 10. The term error flag is commonly used to refer to a signal designating the presence of an error that has been detected in video data being concurrently written in. At the output 4 of the picture field memory F the luminance information Y becomes available and likewise the chrominance information C at an output 5.

The picture field memory F consists of four parallel memory regions for storing so-called sectors of the luminance information Y, the chrominance information C and related error flags EF and write flags WF. The term write flag is used to refer to a signal for inhibiting the erasure of corresponding video data by overwriting. According to the invention, the error and write flags are written into static memories and the video information data are written into dynamic memories. Under the single address provided at an address input A of the picture field memory F the pixel (picture element) values for the luminance and chrominance information as well as the error and write flags can be put into memory. The write flags WF are generated by the memory system as the respective video data pixel values are written into the picture field memory. They are erased when the respective pixel values are read out. The generation and storage of a write flag is commonly referred to as the "setting" of the write flag (similar terminology is used in connection with error flags).

Both the write flags and the error flags serve for control of writing in of the video data. A write-in access into the picture field memory F at a selected address will be blocked if an error flag EF is set at that address and at the same time a write flag WF is set which is read out at this address, signifying that the corresponding video data word has just been stored in the picture field memory F.

In a write-in operation of the picture field memory F the addresses generated in the corresponding write control unit 10 are supplied to the picture field memory F over a controlled changeover switch 6 which is then in the write position. In a read-out operation the address input A of the picture field memory F is connected by the changeover switch 6 with a read-out control unit 11. The controlled switch 6 is controlled by an access control unit 12 which produces the selection of the desired mode of operation of the several memories. In the drawing there are shown inputs designating the mode in which the picture field memory F is to be operated. Only one mode is active at any one time. The input marked v<1 on the drawing is for designating slow motion, v=1 designates normal speed and v>1 designates fast motion. The reference synchronization signal $S_{REF}$ is supplied to the address control circuit 12 from the terminal 13 and another input, a control signal from a register 7 that is two bits wide, is also supplied to the circuit 12. The last mentioned control signal is generated in the read-out control unit 11 and is delayed for a picture field interval in the register 7 by the application of a vertical frequency rhythm signal V derived from the reference synchronization signal $S_{REF}$. The undelayed and delayed control signals are supplied, moreover, to the respective inputs of a comparator 8 for detecting when a change of read-out takes place from one picture field memory to another and provides an output signal when a first read-out of the picture field memory F takes place after it has been written into.

Two additional controlled changeover switches 15 and 16 are controlled by the access control circuit 12 in parallel with the controlled changeover switch 6. In the position of the switches 6, 15 and 16 shown in the drawing, the picture field memory F is in a read-out operation R. In slow motion operation, in which the playback speed is smaller than the recording speed, the picture field written into the picture field memory F is read out repeatedly. In the system of the prior co-pending application, during read-out a pixel value is provided with an error flag if an error flag has been set or if an erased write flag indicates that in the meanwhile no newly arriving pixel value was stored. By these provisions error free data written into the picture field memory F by video information recently read out from the magnetic tape are prevented from being erased by being overwritten by other data. With every write-in and read-out operation of the picture field memory F the flag memories are interrogated and, if appropriate, modified. In consequence a write-in and read-out cycle is produced for the video memory that requires a comparatively longer interval for the cycle portion that includes the read-modification write operations involving the flag memories.

According to the present invention, during the reading out for the first time of a picture field memory F every error flag EF and a corresponding write flag WF are logically correlated in an logic circuit and the resulting signal is read out with the video data. An erased write flag WF during this first read-out designates no input of valid data and produces an error designating signal. Furthermore the signal produced by logically correlated flags EF and WF is supplied over the controlled switch 15 so as to write the error flag back in and is also transmitted as an error flag to following circuits (not shown) over the connection 17. Finally, during the first reading of the picture field memory F the write flag memory is erased by writing in a logic zero in every address during the read-modification-write cycle that is in progress. Thereafter, in every repeated reading of the picture field memory F in slow motion, only the error flag EF is read out. The logic which the circuit 9 is required to fulfill is set forth in the following table:

| INPUTS | | OUTPUT |
|---|---|---|
| EF | WF | 24 |
| 0 | 0 | 1 |
| 0 | 1 | 0 |
| 1 | 0 | 1 |
| 1 | 1 | 1 |

Since the write flag erasing operation, in contrast to the corresponding operation in the system of the cross-referenced copending application, is completed in one picture field interval, the picture field memory F is returned at once to availability for being switched into a write-in mode in the next picture field period in order to receive new video data. In a repeated reading of the picture field memory F, i.e. after the first read-out, the output of the error flag memory is connected with the output 17 through an additional control changeover switch 14. An error flag signal accordingly is present at the output 17 for following circuits for error recognition, just as in the case of the first reading through the circuit 9. These following circuits (not shown) carry out in a well known way an error correction or an error concealment of the video data of the luminance information Y input at 4 by the chrominance information C output at 5, or both and the error flag is again rewritten through the changeover switch 15. Every error flag read out in a first reading is rewritten into the error flag memory in all readings of a read-out sequence, as well as the error flags first created by the circuit 9 in a first reading. The timing of the erasing of the write flags, of course, has to permit their detection in the circuit 9 before it is erased through the control switch 16 by writing in a Zero. Such matters of sequencing are well known and can be carried out in various ways. One of them is incorporated in the circuit 9.

As shown in FIG. 1 the circuit 9 contains an inverter 20 for the write flag WF, an OR gate 21 having one input connected to the error flag EF read-out and another input connected to the inverter output, an AND gate 22 having one input connected to the output of the OR gate 21 and another input connected to the conductor 30 over which a latch pulse LP is provided during an initial portion of the address interval and, finally, the flip-flop 23 serving as a register for the output of the AND gate 22. The flip-flop 23 has its set input connected to the output of the AND gate 22, its reset input connected to a differentiating circuit composed of a capacitor 25 and a resistance 26 so that it will respond to the leading edge of the latch pulse LP, and the Q output of the flip-flop connected to one of the selectable contacts of the switch 14.

The switch 14 assures that the output 24 of the logic circuit 9 will have no significance except during a first reading of a picture field stored in the memory F. The absence of a write flag (WF input 0 to the inverter 20) designates that during an immediately preceding writing of the field being read out into the memory F this word had not been written, or else that the field written into the memory F has been read already at least once. If this is actually a first reading and the switch 14 is in its down position with reference to FIG. 1, there is an error or malfunction and the OR gate 21 will have an output which wills et the flip-flop 23 during the interval of the latch pulse LP. If the write flag WF is present, the inverter will have a null output and the OR gate 21 will have an output only if there is an error flag EF. In that case, the error flag will then set the flip-flop 23 during the latch pulse LP and the error flag EF will be connected through the switch 14 to the line 17 and will also be connected to the read contact of the switch 15 so that the error flag will be rewritten into the error flag memory.

The erase pulse P furnished for every address during read out of the write flag memory is delayed just long enough at the beginning of the address interval to permit the absence of a write flag WF to set the flip-flop 23 through the inverter 20 and the gates 21 and 22. The latch pulse of the next address interval will reset the flip-flop 23, so that the flip-flop 23 will not be set during that next address interval unless a write flag is missing and/or an error flag is present.

Figure 2:
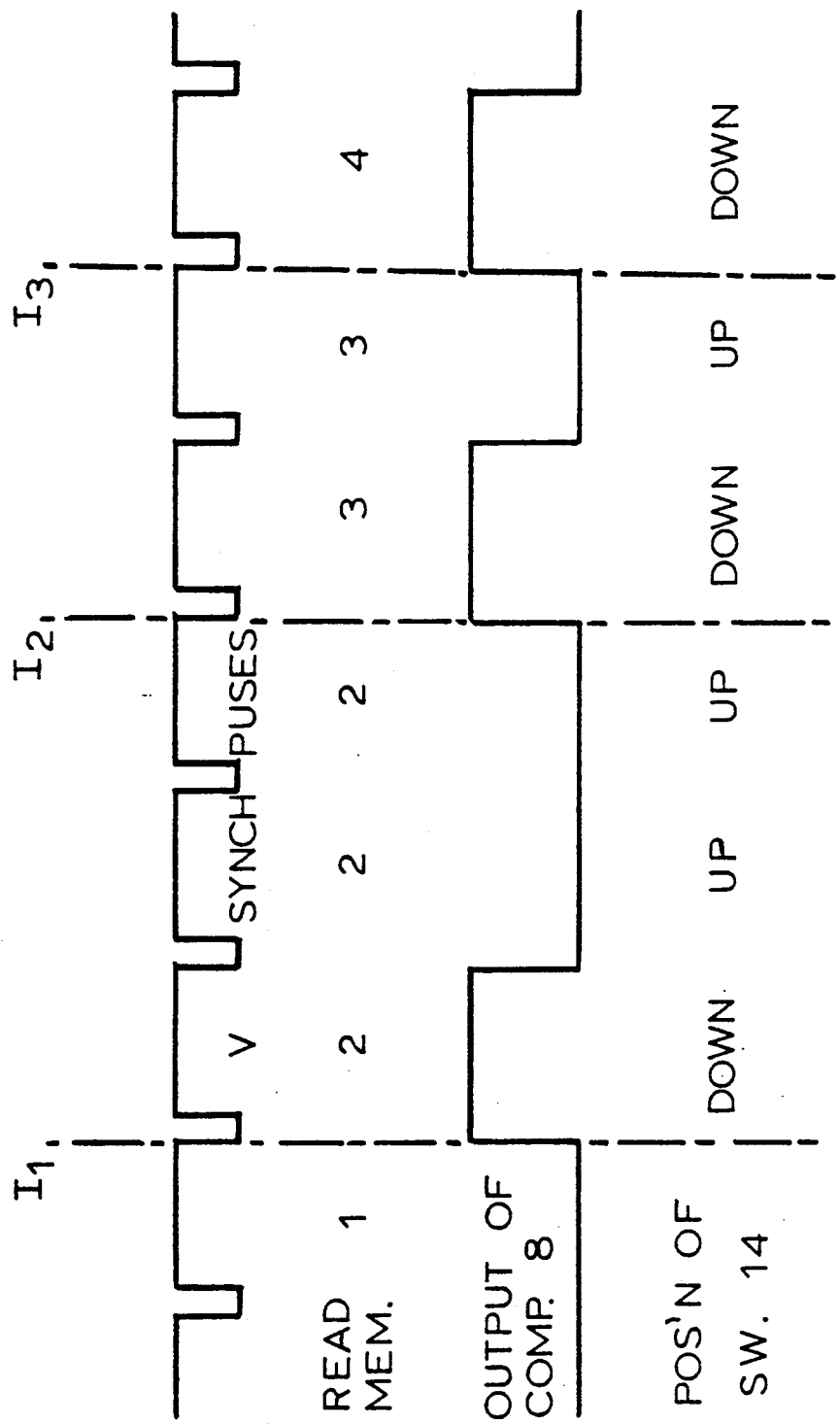
FIG. 2 is a timing diagram illustrating the operation of the system of FIG. 1.

FIG. 2 is a timing diagram showing repeated readings of successive fields from a four memory system in a slow motion playback. Only one memory is read at a time, while the other three memories are available for write in. The top line in FIG. 2 shows negative-going vertical scan frequency pulses. At the instant $I_1$ the memory 2 begins to be read out, following the end of a read out from the memory 1. The lower line shows the output of comparator 8 rising at the instant $I_1$ and remaining high until the next vertical scan frequency pulse. This corresponds to the down position of the switch 14 in FIG. 1. After the end of the first read out of the memory 2 the output of the comparator 8 returns to 0 for the next two readings of the memory 2 and consequently the switch 14 is up. At the instant $I_2$ shown by the vertical line so designated, the read-out function switches over from the memory 2 to the memory 3 as shown by the numerals written between the top line and bottom line of FIG. 2. For one vertical scan interval the output of the comparator 8 is then up and the position of the switch 14 as shown on FIG. 1 is again down. In the illustrated example the memory 3 is read only twice, so that at the instant $I_3$ shown in FIG. 2 the memory 4 is switched in for reading. The number of times a memory is read depends upon how long it takes to write a picture field into the memory assigned for write-in and that finally depends on the chosen slow motion tape speed. In FIG. 2, there is a cyclical assignment of the memories for read-out and it is not necessary for the switching of write-in from one field to another to coincide with the switchovers between memories for read out. When a memory is used for write-in, its changeover switches do not permit read-out of any part of it.

Although the invention has been described with reference to a particular illustrative embodiment, it will be recognized that variations and modifications are possible within the inventive concept.

What is claimed is:

1. An intermediate memory system for an equipment for recording and playback of digital video signals on and from magnetic tape comprising four picture field memories, means for writing video signals into at least one of said memories, means for reading out of video signals from one of said memories at a time, switching means for transferring the reading out operation of said reading out from one of said memories to another and for directing the writing in operation of said writing in means among those of said memories not in use for read-out, and control means for said switching means for providing modes of control thereof respectively for slow-motion, normal speed and fast-motion modes of playback, each of said memories being capable of storing at a single one of a multiplicity of addresses, a luminance pixel value a chrominance pixel value an error flag and a write flag, and wherein:

for operation in said slow motion playback mode of control, logic circuit means are provided for detecting absence of an error flag readout contemporary with presence of a write flag readout from the same address of a said memory and for supplying to following circuits a null output in that case and an error flag output in all other cases during every first read-out operation following a write-in operation for the same memory, means are also provided for supplying to the same following circuits error flag readouts of said same memory during second and subsequent readout operations following said first read-out operation, and means are provided for writing every error flag supplied to following circuits also back into memory and for erasing every write flag after its read-out, during the same address interval as their read-out.

2. The intermediate memory system of claim 1, wherein each said picture field memory is composed of dynamic random access memories for video data and of static random access memories for write flags and error flags.

3. The intermediate memory system of claim 1, wherein for each of said memories said logic circuit means and means for supplying error flag outputs to following circuits together include an inverter having an input connected to a write flag output of the respective memory, an OR gate having a first input connected to an error flag output of the respective memory and a second input connected to an output of said inverter, an AND gate having a first input connected to an output of said OR gate and a second input connected to a source of latch pulses occurring in an initial portion of address intervals for the respective memory, a flip-flop register having a non-inverting output, a set input connected to an output of said AND gate and a reset input connected through a differentiating network to said source of latch pulses for response to leading edges of said latch pulses and a 2-position selector switch having a first selectable terminal connected to said error flag output of the respective memory, a second selectable terminal connected to said noninverting output of said register and a selector terminal connected to an error flag input of said following circuits, said selector switch being controlled by switching signals generated by means for switching the respective memories one at a time into a read-out operations and by vertical scan frequency pulses in such a manner that said selector terminal is put into electrical connection with said second selectable terminal during a first read-out operation of the respective memory following a write-in operation of the respective memory and said selector terminal is put into electrical connection with said first selectable terminal at all other times.

* * * * *